United States Patent
Destefanis et al.

(10) Patent No.: US 11,468,411 B2
(45) Date of Patent: Oct. 11, 2022

(54) METHOD AND SYSTEM OF MINING BLOCKCHAIN TRANSACTIONS PROVIDED BY A VALIDATOR NODE

(71) Applicant: nChain Licensing AG, Zug (CH)

(72) Inventors: Giuseppe Destefanis, London (GB); Simone Madeo, London (GB); Patrick Motylinski, London (GB); Stephane Vincent, Luxembourg (LU)

(73) Assignee: nChain Licensing AG, Zug (CH)

( * ) Notice: Subject to any disclaimer, the term of this patent is extended or adjusted under 35 U.S.C. 154(b) by 169 days.

(21) Appl. No.: 16/622,272

(22) PCT Filed: Jun. 11, 2018

(86) PCT No.: PCT/IB2018/054211
§ 371 (c)(1),
(2) Date: Dec. 12, 2019

(87) PCT Pub. No.: WO2018/229633
PCT Pub. Date: Dec. 20, 2018

(65) Prior Publication Data
US 2020/0104809 A1    Apr. 2, 2020

(30) Foreign Application Priority Data
Jun. 15, 2017   (GB) ..................... 1709518

(51) Int. Cl.
*G06Q 20/06*   (2012.01)
*G06F 16/23*   (2019.01)
(Continued)

(52) U.S. Cl.
CPC ....... *G06Q 20/065* (2013.01); *G06F 16/2365* (2019.01); *G06F 16/2379* (2019.01);
(Continued)

(58) Field of Classification Search
CPC ............ G06Q 20/065; G06Q 20/3672; G06Q 20/38215; G06Q 20/3825; G06Q 10/06; G06F 16/2379; G06F 16/2365; H04L 9/32
(Continued)

(56) References Cited

U.S. PATENT DOCUMENTS

| | | | |
|---|---|---|---|
| 2015/0287026 A1* | 10/2015 | Yang | G06Q 20/06 705/69 |
| 2018/0139278 A1* | 5/2018 | Bathen | H04L 9/3236 |
| 2021/0176251 A1* | 6/2021 | Ozhigin | H04L 63/10 |

FOREIGN PATENT DOCUMENTS

WO    2017109140 A1    6/2017

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — Sara C Hamilton
(74) *Attorney, Agent, or Firm* — Davis Wright Tremaine LLP

(57) ABSTRACT

Validator nodes and methods of operating a validator node to process blockchain transactions. The validator node provides a plurality of mining nodes with access to a set of unconfirmed transactions, typically by providing a hash of those transactions, in exchange for a token from each of the mining nodes. If one of the plurality of mining nodes successfully mines a block containing the set of unconfirmed transactions, the validator node refunds the token to that mining node and retains the remaining tokens. If a miner other than one of the plurality of mining nodes successfully mines a block before any of the plurality of mining nodes is able to mine a block containing the set of unconfirmed
(Continued)

transactions, then the validator node transfers to each of the plurality of mining nodes a modified token.

20 Claims, 9 Drawing Sheets

(51) Int. Cl.
    *G06Q 10/06*     (2012.01)
    *G06Q 20/36*     (2012.01)
    *G06Q 20/38*     (2012.01)
    *H04L 9/32*     (2006.01)

(52) U.S. Cl.
    CPC ......... *G06Q 10/06* (2013.01); *G06Q 20/3672* (2013.01); *G06Q 20/3825* (2013.01); *G06Q 20/38215* (2013.01); *H04L 9/32* (2013.01); *G06Q 2220/00* (2013.01)

(58) Field of Classification Search
    USPC .......................................................... 705/41
    See application file for complete search history.

(56) References Cited

OTHER PUBLICATIONS

Bitfreak, "Blockchain-less P2P Currency (theoretical idea)" retrieved from https://bitcointalk.org/index.php?topic=152662.0, Aug. 16, 2017, 8 pages.

Cunicula, "Proof of Stake Instead of Proof of Work," retrieved from https://www.reddit.com/r/Bitcoin/comments/5vy4qc/how_an_anchored_proof_of_stake_sidec hain_can_help/, Jul. 11, 2011, 8 pages.

Eyal et al., "Bitcoin-NG: A Scalable Blockchain Protocol," retrieved from https://www.usenix.org/system/files/conference/nsdi16/nsdi16-paper-eyal.pdf, Mar. 16-18, 2016, 16 pages.

International Search Report and Written Opinion dated Sep. 10, 2018, Patent Application No. PCT/IB2018/054211, 10 pages.

Maxwell, "[Bitcoin-Dev] Validationless Mining Without Transactions," retrieved from https://lists.linuxfoundation.org/pipermail/bitcoin-dev/2017-May/014340.html, May 15, 2017, 15 pages.

Moralagent, "How an Anchored Proof of Stake Sidechain Can Help the Bitcoin Main Chain," retrieved from https://www.reddit.com/r/Bitcoin/comments/5vy4qc/how_an_anchored_proof_of_stake_sidec hain_can_help/, Feb. 24, 2017, 9 pages.

Nakamoto, "Bitcoin: A Peer-to-Peer Electronic Cash System," Bitcoin, Oct. 31, 2008, https://bitcoin.org/bitcoin.pdf, 9 pages.

Satoshi et al., "Connection Limits," Bitcoin Forum, Aug. 9, 2010, https://bitcointalk.org/index.php?topic=741.0; prev_next=prev, 2 pages.

Sky, "Cypherium: A Scalable and Permis-sion-less Blockchain Platform," retrieved from http://www.cypherium.io/wpcontent/uploads/2017/03/cypherium_whitepaper.pdf, Apr. 29, 2017, 14 pages.

Sujilatha et al., "Deterring Attacks and Abuses of Cloud Computing Services through Economic Measures: Bit Deposit," International Journal of Research in Modern Engineering and Emerging Technology, 1(8): Sep. 2013, 9 pages.

Svendsen, "[bitcoin-dev] Separating mining from tx verification by enabling paying to valid POW header," Linux Foundation, Jan. 24, 2017 [retrieved Aug. 10, 2017], https://lists.linuxfoundation.org/pipermail/bitcoin-dev/2017-January/013475.html, 2 pages.

UK Commercial Search Report dated Oct. 16, 2017, Patent Application No. GB1709518.3, 7 pages.

Uk IPO Search Report dated Nov. 17, 2017, Patent Application No. GB1709518.3, 9 pages.

Zamfir, "Introducing Casper "the Friendly Ghost, Ethereum Blog, retrieved from https://blog.ethereum.org/2015/08/01/introducing-casper-friendly-ghost/, Aug. 1, 2015, 14 pages.

\* cited by examiner

METHOD AND SYSTEM OF MINING BLOCKCHAIN TRANSACTIONS PROVIDED BY A VALIDATOR NODE

This invention relates generally to the problem of allocation of network resources such as processing capabilities and time, in particular with regard to blockchain transactions. More particularly, it relates to methods and devices to improve blockchain mining speed and capacity, and to facilitate mining of a set of validated blockchain transfers.

In this document we use the term 'blockchain' to include all forms of electronic, computer-based, distributed ledgers. These include, but are not limited to consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction (Tx) is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

Network nodes that receive a new transaction will quickly try to push that transaction out to other nodes in the network. Before transmitting a new transaction to other nodes, it is "validated", meaning it is checked against a set of criteria to ensure the transaction meets the basic requirements for a proper transaction according to the applicable blockchain protocol.

In order for a transaction to be written to the blockchain, it is incorporated into a block by a mining node (a "miner") that is designed to collect transactions and form them into blocks. The miner then attempts to complete a "proof of work" with respect to the block (specifically, the block header). Miners throughout the blockchain network compete to be the first to assemble a block of transactions and complete the associated proof of work for that block. The successful miner adds its confirmed block to the blockchain and the block is propagated through the network so that other nodes that maintain a copy of the blockchain can update their records. Those nodes receiving a block also "validate" that block and all the transactions in it to ensure it complies with the formal requirements of the protocol.

One of the bottlenecks associated with blockchain implementation is the delay associated with validating transactions. In the current Bitcoin protocol, each node that receives a new transaction validates it before sending it on to other nodes. Each full node also stores the transaction in a memory pool ("mempool") locally. Mining nodes also maintain a mempool of unconfirmed transactions from which they can assemble the next block for which they will attempt to complete a proof of work. Mining nodes are compensated for their work through transaction fees if they are successful in completing a block that is added to the blockchain (also through "minting" new Bitcoins with each block, although the quantity of minted coins available with each block is diminishing to zero over time).

It would be advantageous to enable or facilitate the use of a blockchain-based network, such as Bitcoin, for high-volume, fast transfers. However, the transaction throughput of about 3 per second (on one protocol at time of writing) is insufficient for handling such electronic transfers, which currently operate at a transactional volume of about 50,000 per second. Accordingly, it would be desirable to find a solution to the speed and scalability constraints that currently limit the Blockchain's ability to process high-volume transactions. One of the scalability constraints is maintenance of the mempool for a large volume of transactions, without sacrificing speed and security. These technical problems are difficult to solve.

Such a solution has now been devised.

Thus, in accordance with the present invention there are provided methods and devices as defined in the appended claims.

The present application may relate generally to the allocation of network resources such as processing capabilities and time. The examples and embodiments provided hereafter may use the (Bitcoin) blockchain as an example of a network in which resources need to be controlled or allocated. In particular, the invention may address the problem of how to control future requests for resources in an efficient and secure manner. This has been a technical difficulty within networking environments for a long time, and can have a significantly detrimental effect upon the overall performance of the network and its ability to produce desired results within an acceptable time frame. Another long-standing technical challenge for network environments is the issue of scalability. Resource-allocation and scalability issues are not trivial problems.

In one or more embodiments, the present invention may address these technical problems, at least in part. The invention may comprise the use of tokens which are allocated to different parties or participants (nodes) within the network. Control or ownership of the token may be used as a mechanism for indicating a network node's ability and/or availability to perform a network-related task. Additionally or alternatively, it may be used to control, direct or otherwise influence the activities of the node(s) to ensure that the computing resources are provided for the allocated task(s).

The present application may describe and disclose network nodes that belong to a decentralised network such as a blockchain network. In a preferred embodiment, the network is a consensus-based blockchain network. The nodes may be referred to as "validator nodes". The validator nodes may maintain a large memory pool of unconfirmed transactions. The network may also comprise mechanisms to provide mining nodes with access to unconfirmed transactions (TXs) from the memory pool. Centralizing the mempool to a group of validator nodes, which may employ distributed storage of the mempool in some cases, improves scalability to handle large volume transaction processing. However, centralizing the mempool may create an issues with compromising mining nodes' access to unconfirmed transactions for building new blocks. Accordingly, to speed transaction processing, the mining nodes focus only on mining and are provided with sets of transactions to work upon by a validator node. To allow access to the transactions, the validator node may obtain one or more tokens (which may be called "deposits" for convenience) from each mining node in a set of miners. The token (deposit), or ownership/control thereof, may be returned from the validator node to a mining node in the case where that mining node succeeds in mining a block. This transfer may be back to the source i.e. the node that provided the token to the validator. A mining node that does not succeed may forfeit control of its token to the validator node, which may then pass control over the token to another node. The token of a miner may be retained/forfeited if one of the other miners in the network succeeds. In some cases, where none of the miners in the set of miners succeeds in mining a block, the validator node may return control over the tokens to the miners. In some cases, the validator node may alter the tokens prior to returning control to the miners. The token may be a digital asset. In some cases For example, it may be a portion of cryptocurrency such as Bitcoin or an alternative cryptocurrency. It may form part of, or be referenced within, a blockchain transaction (Tx).

One of the challenges in implementation of the above-described validator-node-initiated mining process in a practical blockchain network is maintaining security of control over the tokens to prevent loss or theft. In this regard, the present application describes methods and systems for controlling token distribution and control in a validator-node-initiated mining process. The described methods and systems may include structuring blockchain transactions for token distribution with particular locking scripts to ensure security and loss prevention.

In an additional or alternative aspect, the present application may describe a computer implemented method. This may be a method of processing blockchain transactions in a network of nodes. The nodes may include a validator node configured to validate unconfirmed transactions and maintain a pool of unconfirmed transactions, and a plurality of mining nodes configured to compete to complete a block. The method may be implemented by a validator node. The method may include the step of providing the plurality of mining nodes with a set of unconfirmed transactions in exchange for a token from each of the mining nodes; if one of the plurality of mining nodes successfully mines a block containing the set of unconfirmed transactions, returning the token to said one of the plurality of mining nodes and retaining the remaining tokens; and if a miner other than one of the plurality of mining nodes successfully mines a block before any of the plurality of mining nodes is able to mine a block containing the set of unconfirmed transactions, then transferring to each of the plurality of mining nodes a modified token. In some implementations, providing includes generating transactions for pooling of the tokens from each of the mining nodes as pooled tokens and transactions for returning the tokens and transferring the modified tokens, and wherein the transactions for pooling lock control over the pooled tokens to require signatures from at least the validator node and at least one of the mining nodes. In some implementations, the transactions for transferring the modified tokens lock control over the pooled tokens to require signatures from the validator node and each of the mining nodes and determination that a block height for the blockchain has increased.

In some implementations, before miners are provided with access to the set of transactions, the validator node generates a deposit transaction in which each of the mining nodes transfers control over a respective token and in which the collective tokens are pooled at a pooled output address; generates, for each of the mining nodes, a respective claim transaction that is to transfer, from the pooled output address, control over one of the tokens to that mining node and the remaining tokens to the validator node; generates a refund transaction that is to transfer to each mining node, from the pooled output address, the the modified token, and that is to transfer to the validator node an altered token; and obtains signatures from each of the mining nodes on the deposit transaction, the refund transaction, and the respective claim transaction for each mining node. In some of those implementations, an unlocking script for the pooled output address for each of the respective claim transactions requires a secret value associated with the mining node to which the respective claim transaction is to transfer the token. In some of those implementations, if the mining node successfully mines a block containing the set of unconfirmed transactions, the method further includes extracting the secret value from the block and using the secret value to unlock the respective claim transaction associated with the one of the plurality of mining nodes.

In some implementations, providing the plurality of mining nodes with a set of unconfirmed transactions in exchange for a token includes broadcasting the deposit transaction on the blockchain network after obtaining the signatures.

In some implementations, if the mining node successfully mines a block containing the set of unconfirmed transactions, the method further includes returning the token to the one of the plurality of mining nodes and retaining the remaining tokens by broadcasting the respective claim transaction associated with the one of the plurality of mining nodes.

In some implementations, transferring to each of the mining nodes the modified token includes broadcasting the refund transaction on the blockchain network. In some implementations, the altered token is determined as the pooled tokens less the modified tokens.

In some implementations, providing the plurality of mining nodes with a set of unconfirmed transactions includes providing the mining nodes with a hash of the set of transactions from which the mining node may attempt to solve a proof-of-work. The hash may be the merkle root, for example.

In accordance with an alternative wording, the invention may provide a method of processing blockchain transactions in a network of nodes, the nodes including a validator node configured to validate unconfirmed transactions and maintain a pool of unconfirmed transactions, and a plurality of mining nodes configured to compete to complete a block, the method, implemented at the validator node, comprising:

providing the plurality of mining nodes with a set of unconfirmed transactions in exchange for a deposit from each of the mining nodes;

if one of the plurality of mining nodes successfully mines a block containing the set of unconfirmed transactions, refunding the deposit to said one of the plurality of mining nodes and retaining the remaining deposits; and if a miner other than one of the plurality of mining nodes successfully mines a block before any of the plurality of mining nodes is able to mine a block containing the set of unconfirmed transactions, then transferring to each of the plurality of mining nodes the deposit less a validation fee.

In an additional or alternative aspect, the present application describes a validator node arranged to facilitate fast validation of blockchain transactions. The validator node includes a processor; memory storing at least part of a pool of unconfirmed transactions; a network interface; and a blockchain application containing processor-executable instructions that, when executed by the processor, cause the processor to perform any one or more of the methods described herein.

In an additional or alternative aspect, the present application describes a non-transitory processor-readable medium storing processor-executable instructions to process blockchain transactions, wherein the processor-executable instructions, when executed by a processor, cause the processor to carry out any one or more of the methods described herein.

These and other aspects of the present invention will be apparent from and elucidated with reference to, the embodiment described herein. An embodiment of the present invention will now be described, by way of example only, and with reference to the accompanying drawings, in which.

Figure 7:
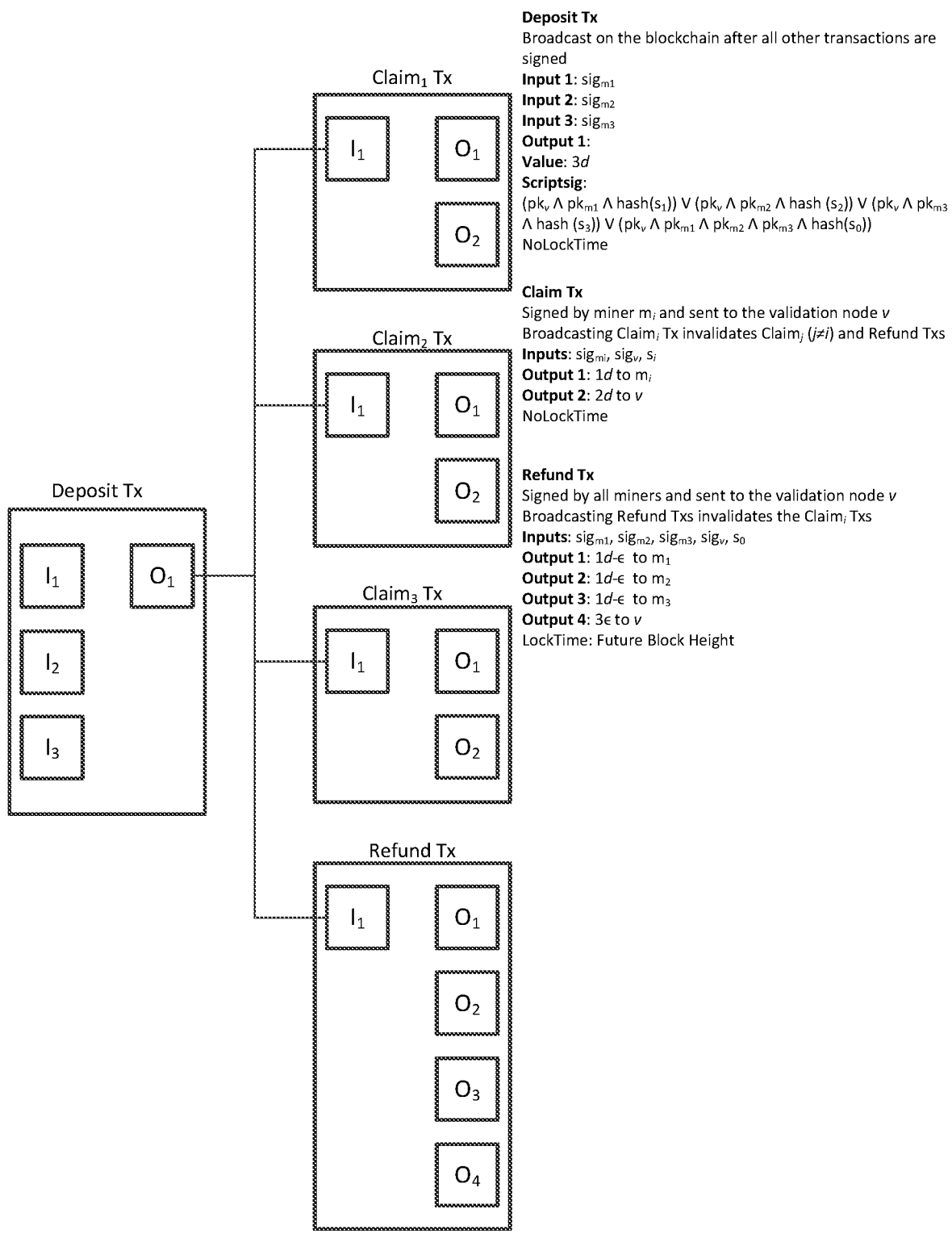

FIG. 7 diagrammatically illustrates an example deposit transaction, example claim transactions, and an example refund transaction for one implementation of validator-node-initiated mining.

Figure 8:
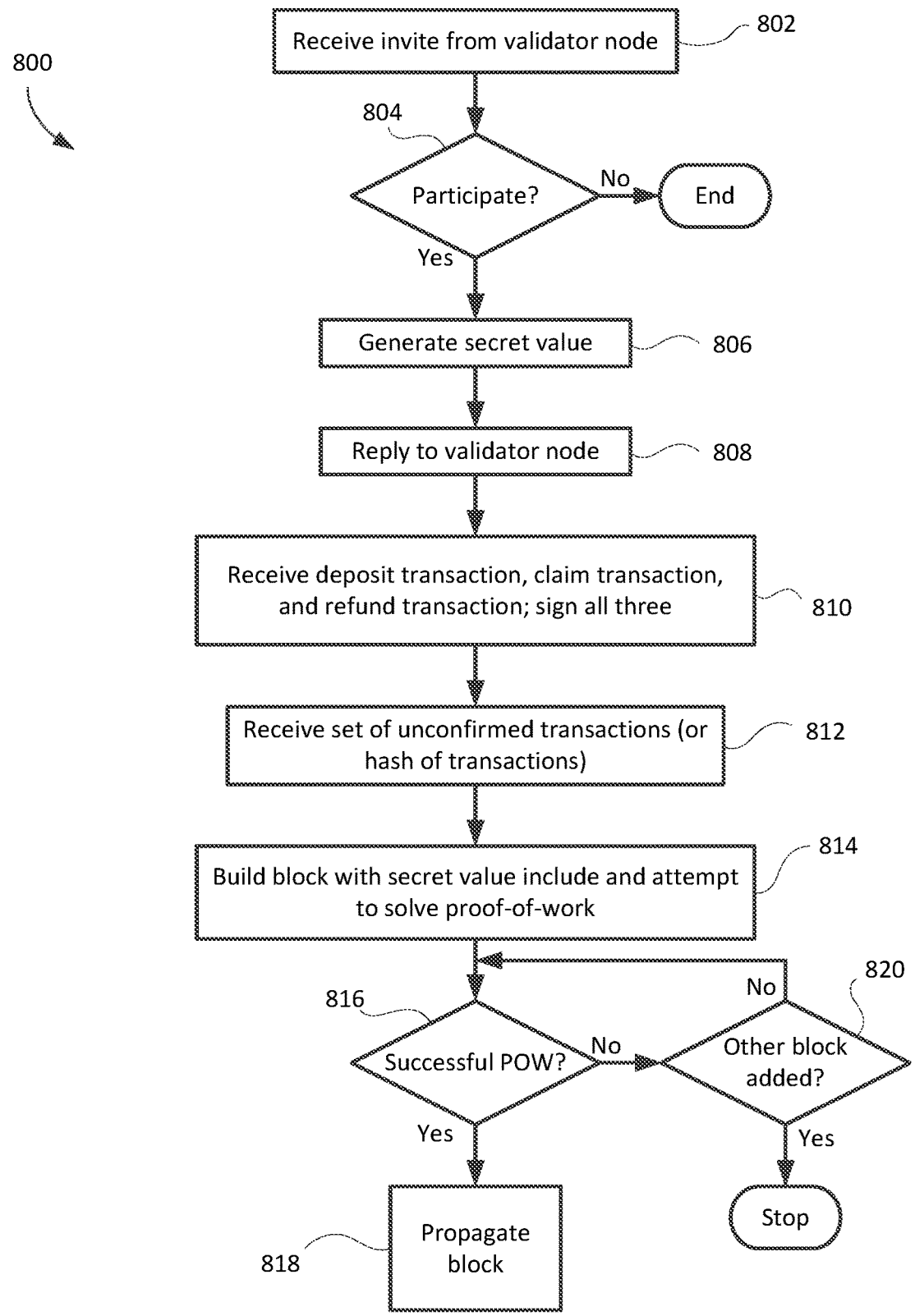

FIG. 8 shows, in flowchart form, a method of mining a block in response to a validator node invitation.

Figure 9:
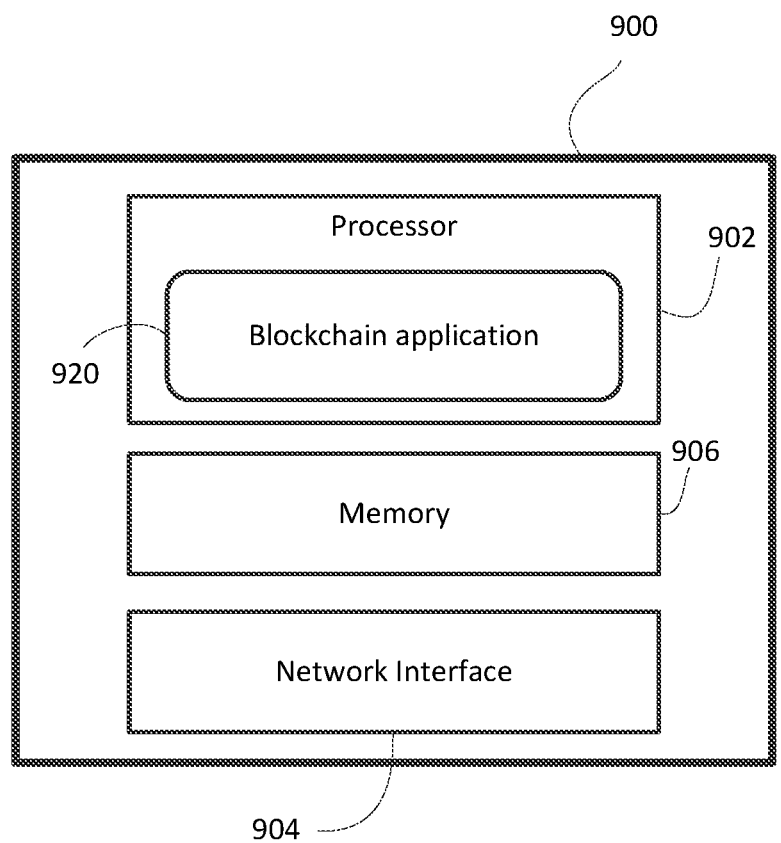

FIG. 9 shows, in block diagram form, a simplified example of a validator node.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
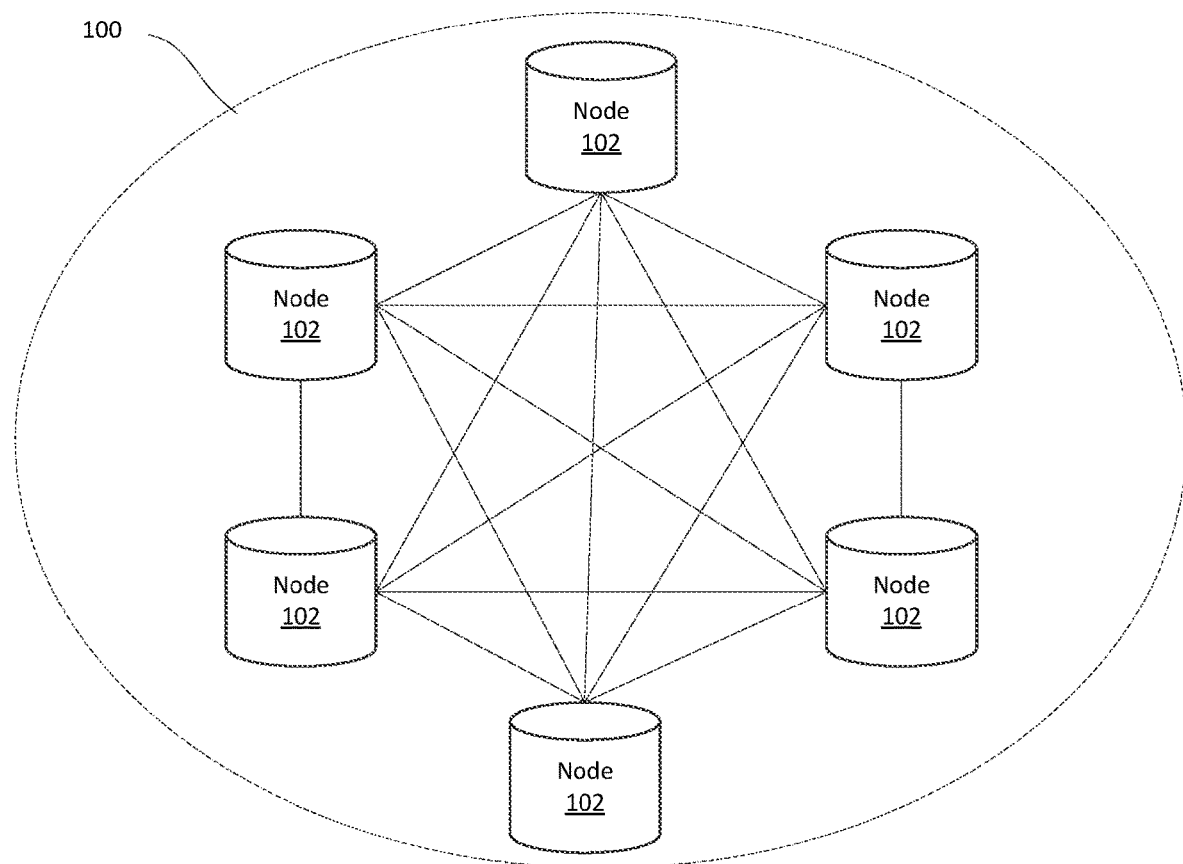
FIG. 1 illustrates an example network of nodes for implementing a blockchain network.

Reference will first be made to FIG. 1 which illustrates, in block diagram form, an example network associated with a blockchain, which may be referred to herein as a blockchain network 100. The blockchain network 100 is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such a smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the nodes 102 may be located in geographically dispersed locations.

Nodes 102 maintain a global ledger of all transactions on the blockchain, grouped into blocks each of which contains a hash of the previous block in the chain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes 102 may be of different types or categories, depending on their functionality. It has been suggested that there are four basic functions associated with a node 102: wallet, mining, full blockchain maintenance, and network routing. There may be variations of these functions. Nodes 102 may have more than one of the functions. For example, a "full node" offers all four functions. A lightweight node, such as may be implemented in a digital wallet, for example, and may feature only wallet and network routing functions. Rather than storing the full blockchain, the digital wallet may keep track of block headers, which serve as indexes when querying blocks.

As noted above, mining nodes ("miners") compete in a race to create the next block in the blockchain. To assemble a block, a miner will build the block as a set of transactions from the pool of unconfirmed transactions (the "mempool"). It then attempts to complete a proof of work with respect to the block it has assembled. If it manages to complete the proof of work prior to receiving notice that any other miner has succeeded in generating a block and completing its proof of work, then the miner propagates its block by sending it to peer nodes on the network. Those nodes validate the block and then send it further on in the network to other nodes. If the miner receives notice that another block has been completed prior to finishing its own proof of work, then the miner abandons its efforts and begins trying to build the next block. Fast propagation of blocks helps avoid wasted effort on behalf of miners and validating nodes.

In current implementations of blockchain, such as the Bitcoin network, each node that receives a block first validates the block before sending it to other nodes. The time taken to validate a block slows propagation of the block through the network. Note that some implementations of blockchain, including evolutions of existing protocols, may provide for block validation by only a subset of nodes rather than each node in the network; however, block validation at most nodes is still likely to be a feature of any blockchain implementation to prevent invalid blocks from propagating through the network.

Validating a block involves confirming that the block meets prescribed criteria set by the applicable blockchain protocol. Example criteria applicable to the Bitcoin protocol are defined in the Bitcoin Core client functions CheckBlock and CheckBlockHeader. In addition to confirming that the block itself conforms to prescribed criteria, each transaction within the block may be assessed for compliance with transaction-level criteria. As an example, the transaction-level criteria applied in the Bitcoin protocol may be seen in detail in the functions AcceptToMemoryPool, CheckTransaction and CheckInputs.

Specific examples of block-level criteria, based on the Bitcoin protocol, include:

The block data structure is syntactically valid.
The block header hash is less than the target difficulty (enforcing the proof of work).
The block timestamp is less than two hours in the future (allowing for time errors).
The block size is within acceptable limits.
The first transaction (and only the first) is a coinbase generation transaction.
All transactions within the block are valid.

Specific examples of transaction-level criteria, based on the Bitcoin protocol, include:

The transaction's syntax and data structure must be correct.
Neither the list of inputs nor of outputs are empty.
Each output value x, as well as the total of all outputs, must be within the range $0<x<21\cdot10^6$.
None of the inputs have null hash.
nLockTime is less than or equal to INT_MAX
The transaction size in bytes is greater than or equal to a minimum and less than a maximum.
The number of signature operations is less than the signature operation limit.
The unlocking script scriptSig can only push numbers on the stack, and the locking script scriptPubkey must match isStandard forms.
For each input, if the referenced output exists in any other transaction in the pool, the transaction must be rejected.
For each input, if the referenced output transaction is a coinbase output, it must have at least COINBASE_MATURITY (100) confirmations.
For each input, the referenced output must exist and cannot already be spent.
Using the referenced output transactions to get input values, check that each input value, as well as the sum, are in the allowed range of values x, i.e. $0<x<21\cdot10^6$.
A matching transaction in the pool, or in a block in the main branch, must exist.
The sum of input values must be equal to or more than the sum of output values.
The transaction fee must be sufficient to gain entry to an empty block.
The unlocking scripts for each input must validate against the corresponding output locking scripts.

These example criteria are illustrative and should not be interpreted as sufficient or necessary to all embodiments as the prescribed criteria may differ in different protocols and may change over time for a given protocol if changes are made to the protocol. In general, transaction-level validation criteria are those prescribed characteristics which a transaction must have to be considered valid under the applicable blockchain protocol. Similarly, the block-level validation criteria are those prescribed characteristics which a block must have to be considered valid under the applicable blockchain protocol.

Some evolutions of the blockchain may provide for further specialized nodes. As an example, there may be nodes that are structured as storage nodes with large quantities of fast access memory and significant network communication resources. The present application proposes and describes an additional type or category of node: a validator node.

Validator nodes are designed to focus on fast validation and propagation of transactions. They do not perform mining functions; however, they include additional functionality to enable fast validation and propagation of transactions. Therefore, they may be dedicated network resources. The validator nodes facilitate the increased transaction volume associated with large scale payment processing by forming a fast-transaction merchant network within the blockchain network 100, designed for quickly validating and propagating transactions.

Each node 102 in the network 100 typically maintains a mempool containing the unconfirmed transactions it has seen and that have not yet been incorporated into the blockchain by a miner completing a proof-of-work. A significant growth in the number of transactions coming from use in payment processing would increase the volume of transactions to store in each mempool. Assuming an average size of a transaction (TX) of 500 bytes and a transaction rate of ~$10^4$ TX/s, the mempool may receive ~400 GB of daily incoming data. All of this data needs to be stored for varying amounts of time in a mempool of unconfirmed transactions. Accordingly, in some implementations a network of validator nodes may use a shared mempool implemented by way of a Distributed Hash Table (DHT) in order to store the pool of unconfirmed transactions, rather than storing a complete mempool at each validator node. In such an implementation, mining nodes and/or some other types of nodes may not necessarily maintain a full mempool locally so as to relieve them of the burden of storing and updating a very large pool of unconfirmed transactions. Instead, the mining nodes and/or other types of specialized nodes may rely on the network of validator nodes to manage the maintenance of the mempool.

Figure 2:
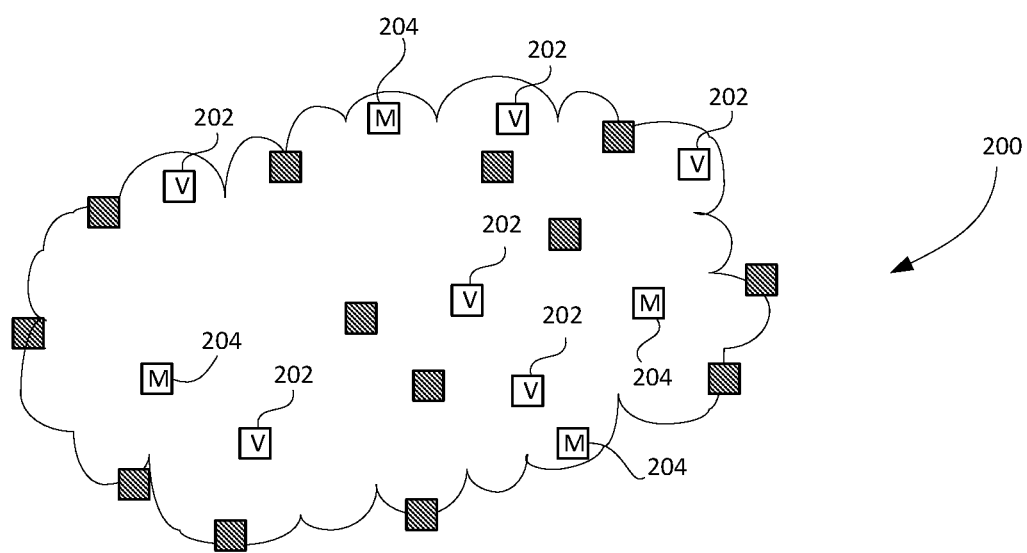
FIG. 2 shows a diagram of an example blockchain network containing validator nodes.

Reference is now made to FIG. 2, which shows one example implementation of a blockchain network 200 of nodes. The blockchain network 200 includes a plurality of validator nodes 202 and a plurality of mining nodes 204. The validator nodes 202, in this example, are physically and logically distributed throughout the network 200. It will be understood that the blockchain network 200 may include a number of other types of nodes, including full nodes, simplified payment verification (SPV) nodes (e.g. wallets), and other specialized nodes having a focused role.

Figure 3:
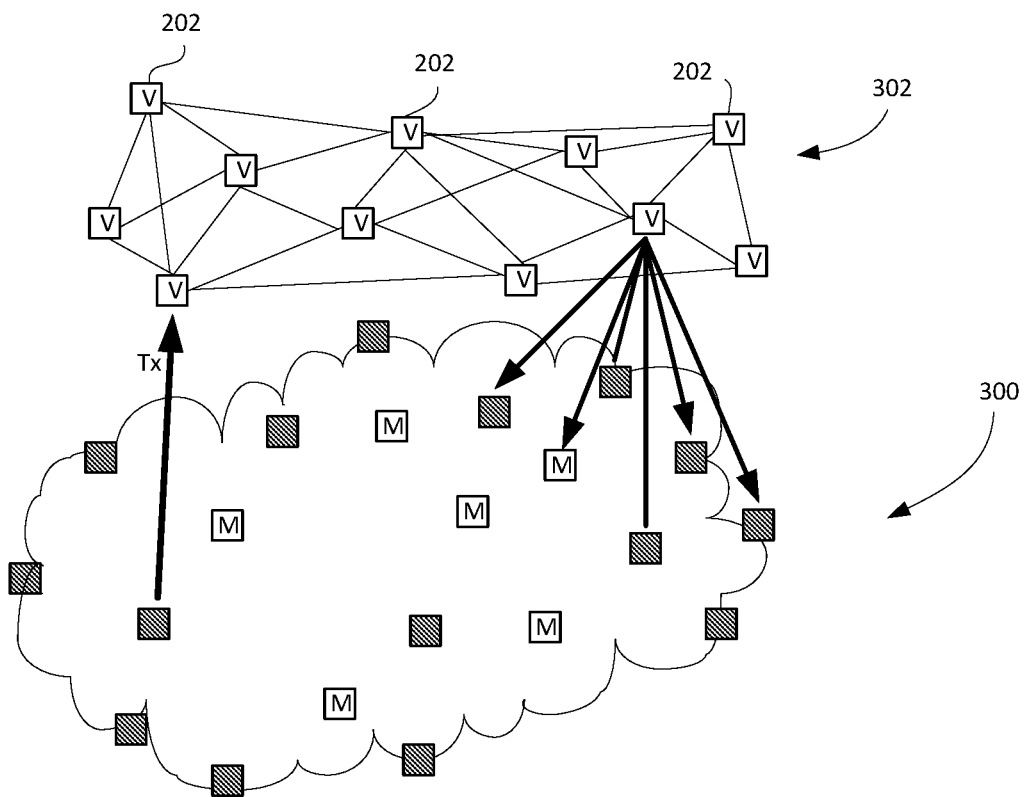
FIG. 3 shows a diagram of an example blockchain network having an overlay network of validator nodes.

Another example implementation of a blockchain network 300 is illustrated in FIG. 3, which shows the validator nodes 202 form a (logical) overlay network 302 within the blockchain network 300. The overlay network 302 may be configured to ensure fast communication between validator nodes 202 within the overlay network 302 to ensure speedy access and retrieval from the shared mempool.

The validator nodes 202 may be implemented to facilitate fast transaction validation and propagation as part of a structure to facilitate large volume payment processing through the blockchain network 200, 300. In this regard, the validator nodes 202 focus on transaction validation and propagation and the mining nodes 204 focus on block mining, and are relieved of the need to store the mempool or validate transactions.

This results in a more efficient, faster (blockchain) network. Traffic is able to pass through the network at an increased rate and thus date transfer is significantly enhanced. Thus, the invention provides an improved blockchain network. It also provides an enhanced network resource allocation mechanism, enabling nodes to communicate and provide their future availability and services. Future requests that will need to be handled by the network can be directed and processed in a time and resource-efficient manner.

This restructuring of the blockchain network 200, 300 and the roles of individual nodes so as to encourage fast transaction processing may create challenges in ensuring growth of the blockchain and non-malicious participation of the various nodes. It is highly important to maintain the decentralized nature of the blockchain network 200, 300 by avoiding imposing control by one or more central authorities. For the network 200, 300 to function properly, the mining nodes 204, validator nodes 202 and other specialized nodes are to interact in a manner that ensures that each node performs its own function or role reliably and that it can trust other nodes will perform their functions or roles reliably. To this end, the interaction between validator nodes 202 and mining nodes 204 may use a plurality of transactions that facilitate cooperation in pursuing the fast mining and propagation of blocks. The transactions may be structured to contain collaborative locking scripts that ensure security over tokens contributed by mining nodes 204 and to prevent loss of tokens.

Figure 4:
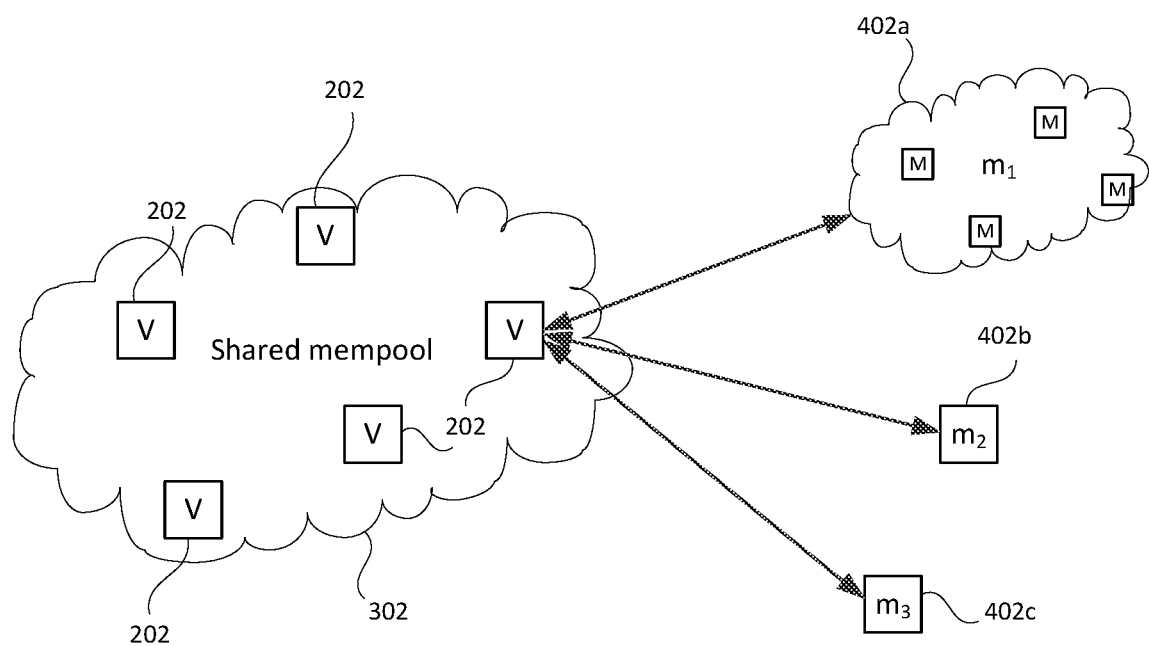
FIG. 4 shows a diagram of an example network of validator nodes maintaining a distributed mempool and a plurality of mining nodes.

Reference is now made to FIG. 4, which diagrammatically shows a plurality of mining nodes 402 (shown individually as 402a, 402b, 402c) and the overlay network 302 containing a plurality of validator nodes 202. In this example, the validator nodes 202 implement the mempool as a shared mempool using, for example, DHT to store the large database of unconfirmed transactions in a distributed manner among the validator nodes 202. However, this is one example implementation and in some other implementations each validator node 202 may store a full copy of the mempool.

The mining nodes 402 may include individual solo miners like those indicated by reference numerals 402b and 402c, and may include a mining pool containing multiple miners, such as that indicated by reference numeral 402a.

The mining nodes 402 in this example do not have a full copy of the mempool and rely on the validator nodes 202 to provide them with the material needed to mine new blocks. In particular, one of the validator nodes 202 may invite the mining nodes 402 to participate in mining a new block using a set of unconfirmed transactions that the validator node 202 has access to in the mempool. The mining nodes 402 may choose to agree to participate in the mining activity by receiving the set of new unconfirmed transactions. In exchange for receiving a token from each mining node 402, the validator node 202 provides each of them with the set of transactions (or a hash of the set of transactions). If one of the participating mining nodes 402 is successful in creating a new block from the set of transactions, then that mining node 402 receives back control over its token from the validator node 202 in addition to the normal fees for mining a block. The other unsuccessful mining nodes 402 forfeit their tokens to the validator node 202. If none of the participating mining nodes 402 succeed in creating the next block, then the validator node 202 transfers to each of the participating mining nodes 402 a respective modified token. The modified token may represent the contributed token modified to represent fewer resources or less time or control. In the case where the tokens represent a digital asset, the modified token may represent a smaller quantity of that digital asset. The digital asset may be computing time or resources, cryptocurrency, or the like. The validator node 202 obtains an altered token as compensation for its efforts in validating transactions and providing the set of validated transactions to the mining nodes. The altered token may represent the difference between the pooled tokens contributed by the mining nodes 402 and the modified tokens transferred to the mining nodes 402.

For ease of illustration, the following example embodiments will presume that the token represent a quantity of cryptocurrency; however, it will be appreciated that the present application is not limited to use in that context and that its methods and systems are applicable to blockchain networks more generally in which a token may represent a range of items, resources or entities. More generally, control over a token (or a modified token, or an altered token) may signify access to computing or other resources of a quantity or length of time indicated by the token. Control over those computing or other resources may be transferred by way of blockchain transaction involving the token. The locking script to the blockchain transaction regulates the node(s) that have control over the token and/or any conditions imposed on control over the token.

Figure 5:
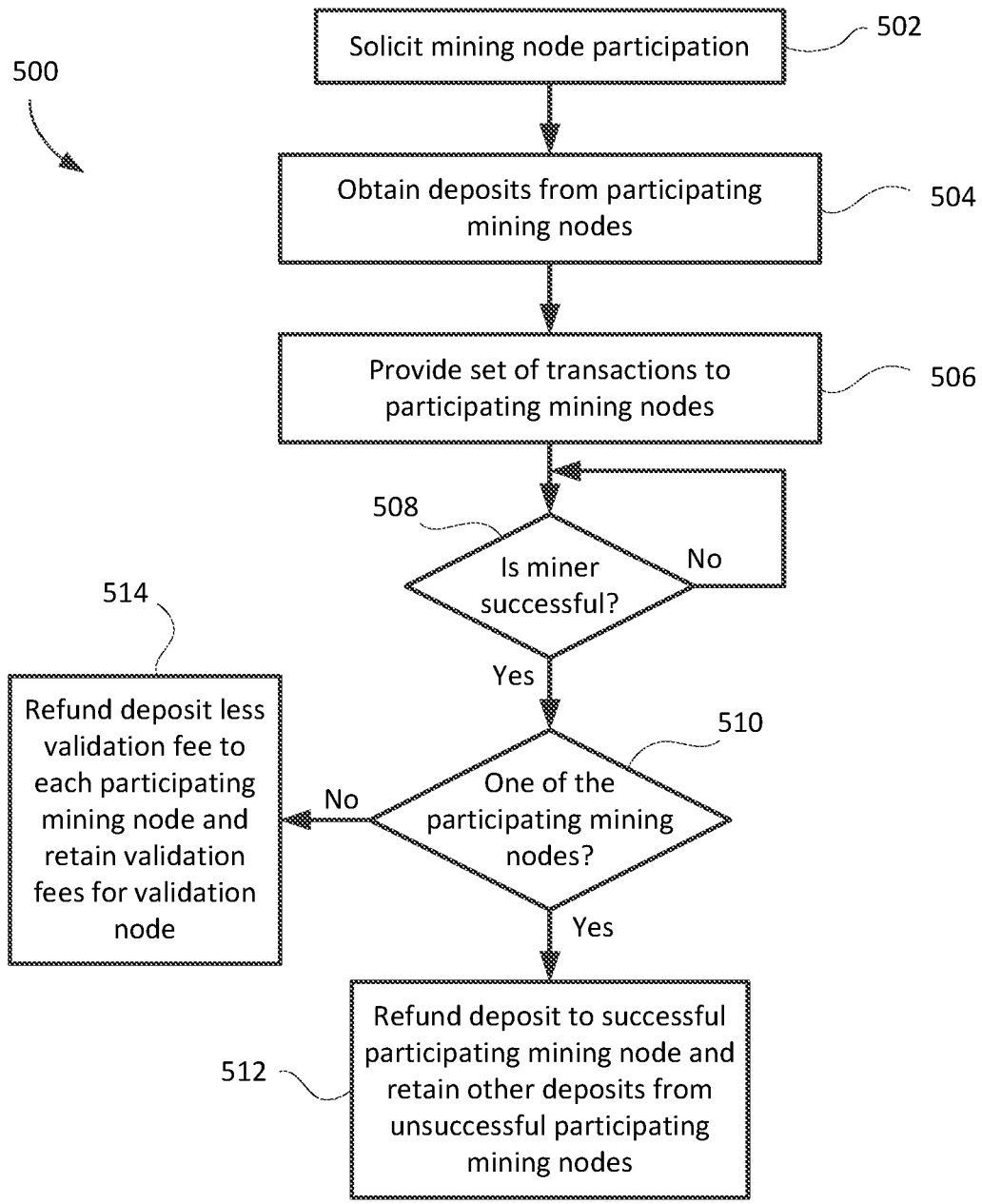
FIG. 5 shows, in flowchart form, one example method for validator-node-initiated mining of a block.

An example flowchart showing an implementation of the process 500 from the point-of-view of the validator node is shown in FIG. 5. The validator node begins in operation 502 by soliciting the participation of a set of mining nodes. The invitation offers to provide the mining nodes with a set of transactions from the shared mempool so that the set of mining nodes can compete in building the next block of the blockchain.

The validator node may have a set of mining nodes that have previously registered with it as potentially interested in participating in mining of blocks. The set of mining nodes may be selected by the validator node based on a list or other available information for contacting mining nodes. In some cases, the selection of the mining nodes may be based on geography, i.e nodes in close proximity physically or logically (in terms of network architecture). The number of mining nodes in the set may depend on the implementation, but includes at least two mining nodes.

The solicitation of a set of mining nodes leads to agreement by at least some of the mining nodes to participate in the mining effort. In some cases, the process 500 only proceeds if at least a minimum number of mining nodes agree to participate. The minimum number of participating mining nodes needed may be two in some implementations, but could be a higher number in some cases.

In operation 504, the participating mining nodes each provide the validator node with a deposit via a deposit transaction. The collective deposits are pooled at an address collectively controlled by the validator node and the mining nodes, and in some scenarios by the validator node and at least one of the mining nodes. In exchange for the deposit and the mining nodes' cooperation in connection with other elements of the method 500, the validator node provides the miners with the set of transactions. It will be appreciated that the validator node may not provide the mining nodes with the full set of transactions but may, in some implementations, provide the mining nodes with a hash of the set of transactions. For example, the mining node may be provided with the merkle root. Using this, the mining node is able to construct the block header that the mining node then uses to try to solve the proof-of-work algorithm. Using a two-step procedure, the mining node may create a coinbase transaction and it may be added to the pre-calculated merkle tree.

The validator node then awaits creation of the next block in the blockchain, as indicated by operation 508. If a miner succeeds in creating a block, then in operation 510 the validator node assesses whether the successful miner was one of its participating miners. If so, then in operation 512 it refunds the deposit paid by the participating mining node and the validator node collects the deposits paid by the unsuccessful participating mining nodes.

If none of the participating mining nodes was successful in creating the next block, then in operation 514, the validator node refunds the deposits to each of the participating mining nodes less a validation fee that is significantly less than the deposit. The sum of the validation fees is retained by the validator node. In most implementations, to incentivize the validation node to select potentially successful mining nodes, the sum of the validation fees should be less than sum of the retained deposits that the validation node would otherwise have collected in operation 512.

Consider an example in which a validator node v solicits and obtains the participation of three mining nodes $m_1$, $m_2$, $m_3$. Each mining node provides a deposit d. If one of the mining nodes is successful, then it receives back its deposit d and the validator node receives 2d. If none of the mining nodes is successful, then they each receive back d-ε, where ε is the validation fee. The validator node receives 3ε in that scenario, wherein 2d>3ε.

The mechanism for implementing the method 500 using blockchain transactions needs to be structured to avoid malicious behaviour or theft by any one of the participating nodes. At the same time, the peer-to-peer nature of the network should be maintained so that the nodes are operating without a central authority. The following example implementations illustrate such a process.

Figure 6:
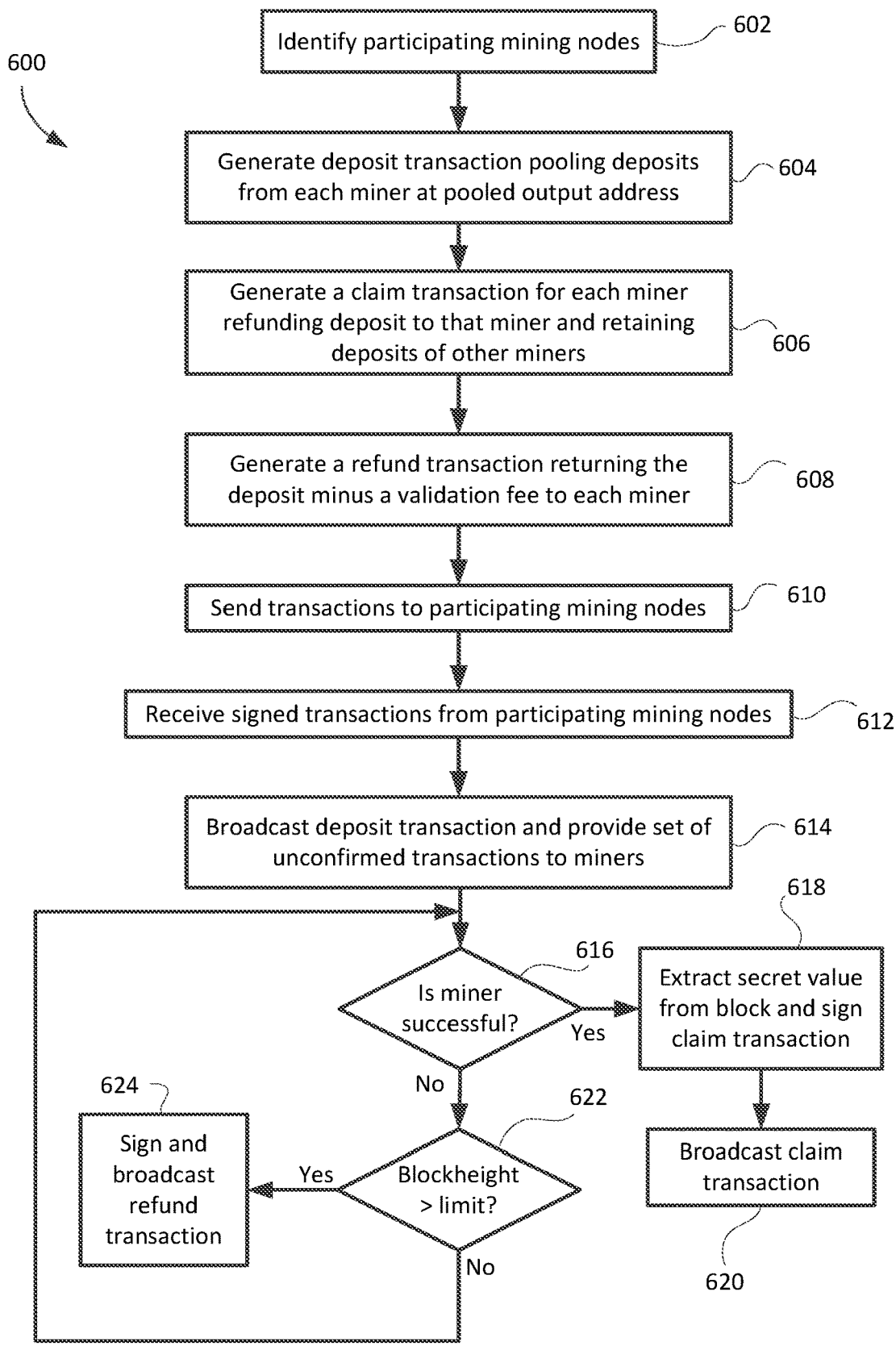
FIG. 6 shows, in flowchart form, another example method for validator-node-initiated mining of a block.

Reference is now made to FIG. 6, which shows a flowchart of an example method 600 for mining blocks in a blockchain process. The method 600 is implemented, in this example, by a validator node v. The validator node v may be part of an overlay network of validator nodes configured to enable fast large volume validation and propagation of payment transactions in a blockchain network. The validator node v has access to a mempool of unconfirmed blockchain transactions. The mempool may be stored locally at the validator node v or may be stored in a distributed manner through the network of validator nodes, such as using a DHT.

In operation 602, the validator node v identifies the participating mining nodes. It may do so, in some implementations, by sending an invitation to a set of mining nodes and receiving a response from the nodes that are interested in participating. In may do so, in some implementations, by publicizing an invitation to a list or other public board accessible to mining nodes, and receiving expressions of interest from the mining nodes interested in participating. Howsoever implemented, the validator node v manages to identify the participating mining nodes.

In agreeing to participate, the mining nodes may provide some information to the validator node v. For example, the mining nodes $m_i$ (i=1, 2, 3) may provide their respective public keys $pubk_i$ to the validator node v. In some examples, the mining nodes may each have a secret value $s_i$, they have generated for the purpose of participating in the current mining effort. They may each provide the validator node v with a hash of their respective secret values: $hash(s_i)$.

In operation 604, the validator node generates a deposit transaction by which the participating mining nodes each provide the deposit value d, and the collective deposits are pooled at a pooled output address. In the case of three participating mining nodes, the value 3d will be allocated to the pooled output address once the deposit transaction has been validated and included in a block. The deposit transaction is structured such that the locking script for the pooled output address can be unlocked by the validator node in cooperation with at least one of the mining nodes plus the secret value $s_i$ for that at least one mining node. The value can also be unlocked through signatures by all of the mining nodes plus the validator node without the secret values $s_i$ in the case where a refund is to be processed. This unlock may include a scripted condition regarding the block height to make access conditional on the fact a block has been successfully added to the blockchain before the refund can be processed. The details of the scripts and conditionals may vary depending on the implementation and the blockchain protocol involved.

In operation 606, the validator node generates a claim transaction for each participating mining node, where one of the claim transactions is intended to be processed if one of the participating mining node associated with that claim transaction is successful in mining a block using the set of transactions that the validator node is to provide. Each claim transaction takes as an input the output of the deposit transaction, i.e. the pooled output address, and allocates the deposit amount d to the participating mining node for that claim transaction. The remainder of the pooled value at the pooled output address (in this example, 2d) is allocated to the validator node. That is, each claim transaction is a refund of the deposit to the associated participating mining node as a reward for being successful in mining the block, and the forfeiture of the deposits of the unsuccessful mining nodes.

In operation 608, the validator node generates a refund transaction for the case where none of the participating mining nodes is successful in mining a block with the provided set of transactions. The refund transaction takes as an input the pooled value at the pooled output address, and sends the deposit amount d minus a validation fee ε of to each of the participating mining nodes. The cumulative validation fees (in this example 3ε) are to be allocated to the validator node by the refund transaction.

It will be appreciated that operations 604, 606, and 608 each involve generating transactions by the validator node. They are shown sequentially for the convenience of illustration, but need not be carried out in the sequence shown, or in sequence at all.

In operation 610, having generated the deposit transaction, the claim transactions, and the refund transaction, the validator node then sends these transactions to each of the participating mining nodes. Each participating mining node signs the deposit transaction, its respective claim transaction, and the refund transaction. The participating mining nodes then return the signed transactions to the validator node. As indicated by operation 612, the validator node receives the signed transactions from the participating mining nodes.

In operation 614, the validator node broadcasts (propagates) the signed deposit transaction through the blockchain network. It will be appreciated it will take some time for the deposit to actually be incorporated into a block that is added to the blockchain. Indeed, the deposit transaction may be one of the validated transactions included in the set of transactions that the participating mining nodes are to attempt to mine. Nevertheless, having propagated the deposit transaction into the blockchain network, it will be added to the mempool and will eventually result in the prescribed deposits being pooled at the pooled output address.

The validator node does not propagate the pre-signed claim transactions or refund transaction. In fact, it cannot complete signing of the claim transactions since it does not have the secret value $s_i$ needed to complete the unlocking script for the input from the pooled output address. It stores the claim transactions and the refund transaction and awaits successful completion of a new block, as indicated by operation 616.

If one of the participating mining nodes is successful in completing a block, i.e. solving the proof-of-work for a new block, then in operation 618, the validator node extracts the secret value $s_i$ from the new block. The successful mining node may include the secret value $s_i$ in the new block by placing it in a non-transactional field. In the Bitcoin protocol, for example, an OP_RETURN code may be used to signal non-transactional output as it marks a transaction output as invalid. This can be used to signal non-transactional data in the blockchain.

The validator node, having extracted the secret value $s_i$, is then able to complete the signature on the input for the claim transaction associated with the successful mining node and, in operation 620, it then broadcasts that claim transaction on the network. This results in refunding the deposit d to the successful mining node, and allocating the remaining deposits 2d to the validator node.

While waiting for one of the participating mining nodes to create a new block, the validator node monitors whether a new block is created by other non-participating mining nodes, as indicated by operation 622. If the block height increases, i.e. if a new block is added to the blockchain, before one of the participating mining nodes succeeds in solving the proof-of-work, then the validator node signs and broadcasts the refund transaction in operation 624. In at least one implementation, signing the refund transaction may include signing with the validator node's signature as well as a secret value so held by the validator node. The function of the validator's secret value so may be to have a value that is not equal to any of the mining node secret values $s_i$ for comparison purposes in the implementation of the locking/unlocking script operations. In some implementations, the validator node may forego use of its own secret value so as part of the unlocking script for the refund transaction.

Reference is now made to FIG. 7, which diagrammatically illustrates the relationship between the deposit transaction, the claim transactions and the refund transaction. It will be appreciated that this example is based on there being three participating mining nodes, $m_1$, $m_2$, and $m_3$.

To further illustrate by way of the above example, and assuming implementation using the Bitcoin protocol, the following tables show simplified example details of the deposit transaction, claim transaction and refund transaction.

| Deposit Transaction | |
|---|---|
| <ID> | Transaction-ID |
| Version Number | Version number |
| 3 | Number of inputs |
| Previous Tx | Prev Trans Output |
| 0 | Prev Trans Output index |
| Script length | Script length |
| <$m_1$ signature> <$m_1$ pubkey> | ScriptSig |
| <ScriptSignatureFlags> | ScriptSig |
| Previous Tx | Prev Trans Output |
| 0 | Prev Trans Output index |

| Deposit Transaction (continued) | |
|---|---|
| Script length | Script length |
| <$m_2$ signature> <$m_2$ pubkey> | ScriptSig |
| <ScriptSignatureFlags> | ScriptSig |
| Previous Tx | Prev Trans Output |
| 0 | Prev Trans Output index |
| Script length | Script length |
| <$m_3$ signature> <$m_3$ pubkey> | ScriptSig |
| <ScriptSignatureFlags> | ScriptSig |
| Sequence number | Sequence number |
| 1 | Number of Outputs |
| 3d (BTC) | Output value |
| Output Script Length | Output script length |
| P_DUP_OP_HASH160 <H($s_1$)> OP_EQUAL OP_IF   OP_DROP OP_2 <v pubkey> <$m_1$ pubkey> OP_2 OP_CHECKMULTISIG OP_ELSE   OP_DUP OP_HASH160 <H($s_2$)> OP_EQUAL   OP_IF     OP_DROP OP_2 <v pubkey> <$m_2$ pubkey> OP_2 OP_CHECKMULTISIG   OP_ELSE     OP_DUP OP_HASH160 <H($s_3$)> OP_EQUAL     OP_IF       OP_DROP OP_2 <v pubkey> <$m_3$ pubkey> OP_2       OP_CHECKMULTISIG     OP_ELSE       OP_DROP <future block height>       OP_CHECKLOCKTIMEVERIFY OP_4 <v pubkey>       <$m_1$ pubkey> <$m_2$ pubkey> <$m_3$ pubkey> OP_4       OP_CHECKMULTISIG     OP_ENDIF   OP_ENDIF OP_ENDIF | Output script |
| LockTime | LockTime |

| Claim$_1$ | |
|---|---|
| <ID> | Transaction-ID |
| Version Number | Version number |
| 1 | Number of inputs |
| Deposit Transaction | Prev Trans Output |
| 0 | Prev Trans Output index |
| Script length | Script length |
| <v signature> <$m_1$ signature> <$s_1$> | ScriptSig |
| <ScriptSignatureFlags> | ScriptSig |
| Sequence number | Sequence number |
| 2 | Number of Outputs |
| 1d (BTC) | Output value |
| Output Script Length | Output script length |
| OP_DUP OP_HASH160 <H($m_1$pubkey)> OP_EQUALVERIFY OP_CHECKSIG | Output script |
| 2d (BTC) | Output value |
| Output Script Length | Output script length |
| OP_DUP OP_HASH160 <H(v pubkey)> OP_EQUALVERIFY OP_CHECKSIG | Output script |
| LockTime | LockTime |

| Refund | |
|---|---|
| <ID> | Transaction-ID |
| Version Number | Version number |
| 1 | Number of inputs |
| Deposit Transaction | Prev Trans Output |
| 0 | Prev Trans Output index |

-continued

Refund

| | |
|---|---|
| Script length | Script length |
| <v signature> <$m_1$ signature> <$m_2$ signature> <$m_3$ signature> <$s_0$> | ScriptSig |
| <ScriptSignatureFlags> | ScriptSig |
| Sequence number | Sequence number |
| 4 | Number of Outputs |
| d − ε (BTC) | Output value |
| Output Script Length | Output script length |
| OP_DUP OP_HASH160 <H($m_1$pubkey)> OP_EQUALVERIFY OP_CHECKSIG | Output script |
| d − ε (BTC) | Output value |
| Output Script Length | Output script length |
| OP_DUP OP_HASH160 <H($m_2$ pubkey)> OP_EQUALVERIFY OP_CHECKSIG | Output script |
| d − ε (BTC) | Output value |
| Output Script Length | Output script length |
| OP_DUP OP_HASH160 <H($m_3$ pubkey)> OP_EQUALVERIFY OP_CHECKSIG | Output script |
| 3ε (BTC) | Output value |
| Output Script Length | Output script length |
| OP_DUP OP_HASH160 <H(v pubkey)> OP_EQUALVERIFY OP_CHECKSIG | Output script |
| future block height | LockTime |

It will be appreciated that the foregoing transactions details are illustrative and that the present application is not limited to implementation using those details, or limited to use of the Bitcoin protocol. Other blockchain protocols and other transaction structures may be used in other implementations.

FIG. 8 shows, in flowchart form, one example process 800 for mining blocks in the context of a fast transaction blockchain network with validator nodes maintaining the mempool. The process 800 is implemented by a mining node in the network.

The process 800 is initiated when the mining node receives or obtains an invitation from a validator node. The invitation offers the mining node a set of validated transactions for the mining node to use in trying to build a new block. The invitation may also specify the deposit required and/or the validation fee payable in the event that none of the participating mining nodes is successful.

In operation 804, the mining node determines whether to participate. It may base the determination on any number of factors, including the identity of the validator node, the number of transactions offered, the transaction fees available for mining the set of transactions, or whether the mining node is able to verify the authenticity of the validator node, among other factors. If the mining node elects not to participate then it may decline the invitation.

If the mining node determines that it will participate in the mining effort, then it generates its secret value $s_i$ in operation 806. The mining node creates a new secret value for every mining effort in which it participates. The mining node also replies to the invitation from the validator node, as indicted by operation 808. The reply may include the mining node's public key. The reply may further include a hash of the mining node's secret value $s_i$.

In operation 810, the mining node receives the deposit transaction, claim transaction and refund transaction generated by the validator node. The mining node signs all three transactions with its signature. In particular, it signs the input to the deposit transaction providing its deposit value of d. It also signs the input to its claim transaction for spending the output from the deposit transaction, and signs the input to the refund transaction for spending the output from the deposit transaction. Once the transactions are signed, the mining node returns them to the validator node.

In operation 812, the mining node may receive the set of transactions from the validator node. In many implementations, the mining node receives the set of transactions in the form of a hash of the set of transactions, e.g. the merkle root.

The mining node then attempts to complete the proof-of-work needed to successfully mine a new block using the set of transactions (or at least the hash of the set of transactions). It ensures that the shared secret $s_i$ is included in the block. In some cases, depending on the blockchain protocol involved, it may be embedded in a non-transactional field. In some cases, it may be possible to put non-transactional data in the block header. In yet other cases, it may be possible to put non-transactional data in a transaction within the block. As noted above, in the Bitcoin protocol it can be possible to include non-transactional data in a block using the OP_RETURN op code within a transaction.

If the mining manages to succeed in mining the block, i.e. completing the proof-of-work, as indicated by operation 816, then in operation 818 the mining node propagates the block (or at least the block header). For example, the mining node may propagate the block header to one or more of the validator nodes, where the block may be assembled, validated, stored and propagated.

While working on mining the block, the mining node assesses whether another node has succeeded in mining a new block, as indicated by operation 820. If another block appears on the blockchain before the mining node is able to complete the proof-of-work for its own new block, then it abandons the effort to mine the new block. If the new block was completed by one of the other participating mining nodes, then the mining node will receives no refund and forfeit its deposit. If, however, the new block was completed by another mining node that was not one of the participating mining nodes, then the mining node will receive a partial refund of its deposit. Specifically, the mining node will receive back its deposit minus the validation fee.

Reference will now be made to FIG. 9, which shows, in block diagram form, a simplified example of a node. In this example the node is a validator node 900. The validator node 900 in this example includes a processor 902, a network interface 904 and memory 906.

The validator node 400 may be implemented using any suitable computing hardware having network connectivity and sufficient processing and memory resources to carry out the functions described herein. The validator node 900 may include processor-executable instructions to implement the functions described herein. In some cases, the processor-executable instructions may be referred to as a blockchain application 920, although it will be appreciated that the instructions may be implemented in one or more modules, applications, scripts or other programming structures, depending on the hardware and operating system. The processor 902 may include a multi-core processor, and/or multiple processors. The memory 906 stores data, including, in this example, an assigned portion of the DHT-based mempool.

It will be understood that the devices and processes described herein and any module, routine, process, thread, application, or other software component implementing the described method/process for configuring the video feature extractor may be realized using standard computer programming techniques and languages. The present application is not limited to particular processors, computer languages, computer programming conventions, data structures, or other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method implemented by one or more processors of a validator node device on a blockchain network, the computer-implemented method comprising:
   validating, by the one or more processors, a set of unconfirmed transactions to result in a validated set of unconfirmed transactions;
   determining, by the one or more processors, a hash of the validated set of unconfirmed transactions;
   storing, by the one or more processors, in a memory pool of unconfirmed transactions, the validated set of unconfirmed transactions;
   providing, by the one or more processors, to a plurality of blockchain mining nodes, the validated set of unconfirmed transactions or the hash of the validated set of unconfirmed transactions, in exchange for a token from each of the plurality of blockchain mining nodes, wherein the providing comprises:
      generating, by the one or more processors, first transactions to pool the tokens from each of the plurality of blockchain mining nodes as pooled tokens, wherein the first transactions lock control over the pooled tokens, and wherein unlocking the control requires signatures from at least the validator node device and at least one of the plurality of blockchain mining nodes; and
      generating, by the one or more processors, second transactions to return the tokens and transfer modified tokens;
   returning, by the one or more processors, a first token to one of the plurality of blockchain mining nodes and retaining, by the one or more processors, the remaining tokens as a result of the one of the plurality of blockchain mining nodes successfully mining a block comprising the validated set of unconfirmed transactions; and
   transferring, by the one or more processors, to each of the plurality of blockchain mining nodes, a modified token as a result of a miner other than the plurality of blockchain mining nodes successfully mining the block comprising the validated set of unconfirmed transactions.

2. The computer-implemented method of claim 1, wherein the second transactions to transfer the modified tokens lock control over the pooled tokens, wherein unlocking the control requires:
   signatures from the validator node device and each of the plurality of blockchain mining nodes, and
   a determination that a block height for the blockchain has increased.

3. The computer-implemented method of claim 2, wherein providing, by the one or more processors, to the plurality of blockchain mining nodes, the validated set of unconfirmed transactions or the hash of the validated set of unconfirmed transactions, further comprises:
   generating, by the one or more processors, a deposit transaction in which each of the plurality of blockchain mining nodes transfers control over a respective token and in which the pooled tokens are pooled at a pooled output address;
   generating, by the one or more processors, for each of the plurality of blockchain mining nodes, a respective claim transaction to transfer, from the pooled output address, control over one of the tokens to an associated mining node and the remaining tokens to the validator node device;
   generating, by the one or more processors, a refund transaction to transfer:
      the modified token to each of the plurality of blockchain mining nodes, from the pooled output address, and
      an altered token to the validator node device; and
   obtaining, by the one or more processors, the signatures from each of the plurality of blockchain mining nodes on the deposit transaction, the refund transaction, and the respective claim transaction for each of the plurality of blockchain mining nodes.

4. The computer-implemented method of claim 3, wherein an unlocking script for the pooled output address for each of the respective claim transactions requires a hash of an associated secret value provided by the associated mining node to which the respective claim transaction transfers the respective token.

5. The computer-implemented method of claim 4, wherein the one of the plurality of blockchain mining nodes successfully mines a block comprising the validated set of unconfirmed transactions, and the computer-implemented method further comprises:
   extracting, by the one or more processors, a secret value, provided by the one of the plurality of blockchain mining nodes, from the block; and
   using, by the one or more processors, the secret value to unlock the respective claim transaction associated with the one of the plurality of blockchain mining nodes.

6. The computer-implemented method of claim 3, wherein providing, by the one or more processors, to the plurality of blockchain mining nodes, the validated set of unconfirmed transactions or the hash of the validated set of unconfirmed transactions, in exchange for the token includes broadcasting, by the one or more processors, the deposit transaction on the blockchain network after obtaining the signatures.

7. The computer-implemented method of claim 3, wherein the one of the plurality of blockchain mining nodes successfully mines a block comprising the validated set of unconfirmed transactions, and wherein returning, by the one or more processors, the token to the one of the plurality of blockchain mining nodes and retaining, by the one or more processors, the remaining tokens comprises broadcasting, by the one or more processors, on the blockchain network, the respective claim transaction associated with the one of the plurality of blockchain mining nodes.

8. The computer-implemented method of claim 3, wherein transferring, by the one or more processors, to each of the plurality of blockchain mining nodes the modified token comprises broadcasting, by the one or more processors, the refund transaction on the blockchain network.

9. The computer-implemented method of claim 3, wherein the altered token is determined as the pooled tokens less the modified tokens.

10. The computer-implemented method of claim 3, wherein the hash of the validated set of unconfirmed transactions is used by the associated mining node to solve a proof-of-work.

11. The computer-implemented method of claim 10, wherein the hash of the validated set of unconfirmed transactions comprises a Merkle root.

12. The computer-implemented method of claim 1, wherein the memory pool of unconfirmed transactions is stored in a distributed hash table (DHT) that associates the validated set of unconfirmed transactions with the hash of the validated set of unconfirmed transactions.

13. A validator node device that facilitates validation of blockchain transactions on a blockchain network, the validator node device comprising:
one or more processors;
memory storing at least part of a pool of unconfirmed transactions; and
a non-transitory processor-readable medium storing processor-executable instructions that, when executed by the one or more processors, cause the validator node device to:
validate a set of unconfirmed transactions to result in a validated set of unconfirmed transactions;
determine a hash of the validated set of unconfirmed transactions;
store, in the pool of unconfirmed transactions, the validated set of unconfirmed transactions;
provide, to a plurality of blockchain mining nodes, the validated set of unconfirmed transactions or the hash of the validated set of unconfirmed transactions, in exchange for a token from each of the plurality of blockchain mining nodes, wherein to provide the validated set of unconfirmed transactions, the processor-executable instructions, when executed by the one or more processors, further cause the validator node device to:
generate first transactions to pool the tokens from each of the plurality of blockchain mining nodes as pooled tokens, wherein the first transactions lock control over the pooled tokens, and wherein unlocking the control requires signatures from at least the validator node device and at least one of the plurality of blockchain mining nodes; and
generate second transactions to return the tokens and transfer modified tokens;
return a first token to one of the plurality of blockchain mining nodes and retain the remaining tokens as a result of the one of the plurality of blockchain mining nodes successfully mining a block comprising the validated set of unconfirmed transactions; and
transfer, to each of the plurality of blockchain mining nodes, a modified token as a result of a miner other than the plurality of blockchain mining nodes successfully mining the block comprising the validated set of unconfirmed transactions.

14. The validator node device of claim 13, wherein the second transactions to transfer the modified tokens lock control over the pooled tokens, wherein unlocking the control requires:
signatures from the validator node device and each of the plurality of blockchain mining nodes, and
a determination that a block height for the blockchain has increased.

15. The validator node device of claim 14, wherein to provide the plurality of blockchain mining nodes with the validated set of unconfirmed transactions or the hash of the validated set of unconfirmed transactions, the processor-executable instructions, when executed by the one or more processors, further cause the validator node device to:
generate a deposit transaction in which each of the plurality of blockchain mining nodes transfers control over a respective token and in which the pooled tokens are pooled at a pooled output address;
generate, for each of the plurality of blockchain mining nodes, a respective claim transaction to transfer, from the pooled output address, control over one of the tokens to an associated mining node and the remaining tokens to the validator node device;
generate a refund transaction to transfer:
the modified token to each of the plurality of blockchain mining nodes, from the pooled output address, and
an altered token to the validator node device; and
obtain the signatures from each of the plurality of blockchain mining nodes on the deposit transaction, the refund transaction, and the respective claim transaction for each of the plurality of blockchain mining nodes.

16. The validator node device of claim 15, wherein the hash of the validated set of unconfirmed transactions comprises a Merkle root that is used by the associated mining node to solve a proof-of-work.

17. A non-transitory processor-readable medium storing processor-executable instructions to process blockchain transactions, wherein the processor-executable instructions, when executed by one or more processors of a validator node device, cause the one or more processors to:
validate a set of unconfirmed transactions to result in a validated set of unconfirmed transactions;
determine a hash of the validated set of unconfirmed transactions;
store, in a memory pool of unconfirmed transactions, the validated set of unconfirmed transactions;
provide, to a plurality of blockchain mining nodes, the validated set of unconfirmed transactions or the hash of the validated set of unconfirmed transactions, in exchange for a token from each of the plurality of blockchain mining nodes, wherein to provide the validated set of unconfirmed transactions, the processor-executable instructions, when executed by the one or more processors, further cause the one or more processors to:
generate first transactions to pool the tokens from each of the plurality of blockchain mining nodes as pooled tokens, wherein the first transactions lock control over the pooled tokens, and wherein unlocking the control requires signatures from at least the validator node device and at least one of the plurality of blockchain mining nodes; and
generate second transactions to return the tokens and transfer modified tokens;

return a first token to one of the plurality of blockchain mining nodes and retain the remaining tokens as a result of the one of the plurality of blockchain mining nodes successfully mining a block comprising the validated set of unconfirmed transactions; and transfer, to each of the plurality of blockchain mining nodes, a modified token as a result of a miner other than the plurality of blockchain mining nodes successfully mining the block comprising the validated set of unconfirmed transactions.

18. The non-transitory processor-readable medium of claim 17, wherein the second transactions to transfer the modified tokens lock control over the pooled tokens, wherein unlocking the control requires:

signatures from the validator node device and each of the plurality of blockchain mining nodes, and a determination that a block height for the blockchain has increased.

19. The non-transitory processor-readable medium of claim 18, wherein the processor-executable instructions, when executed by the one or more processors, further cause the one or more processors to:

generate a deposit transaction in which each of the plurality of blockchain mining nodes transfers control over a respective token and in which the pooled tokens are pooled at a pooled output address;

generate, for each of the plurality of blockchain mining nodes, a respective claim transaction to transfer, from the pooled output address, control over one of the tokens to an associated mining node and the remaining tokens to the validator node device;

generate a refund transaction to transfer:

the modified token to each of the plurality of blockchain mining nodes, from the pooled output address, and an altered token to the validator node device; and obtain the signatures from each of the plurality of blockchain mining nodes on the deposit transaction, the refund transaction, and the respective claim transaction for each of the plurality of blockchain mining nodes.

20. The non-transitory processor-readable medium of claim 19, wherein the hash of the validated set of unconfirmed transactions comprises a Merkle root that is used by the associated mining node to solve a proof-of-work.

* * * * *